(12) United States Patent
McDermott

(10) Patent No.: US 10,612,263 B2
(45) Date of Patent: Apr. 7, 2020

(54) COLUMNIC ACTUATED SPRING LOADER SYSTEM

(71) Applicant: David McDermott, San Francisco, CA (US)

(72) Inventor: David McDermott, San Francisco, CA (US)

(*) Notice: Subject to any disclaimer, the term of this patent is extended or adjusted under 35 U.S.C. 154(b) by 0 days.

(21) Appl. No.: 16/139,445

(22) Filed: Sep. 24, 2018

(65) Prior Publication Data
US 2019/0106899 A1 Apr. 11, 2019

Related U.S. Application Data

(60) Provisional application No. 62/568,783, filed on Oct. 5, 2017.

(51) Int. Cl.
*E04H 9/02* (2006.01)
*F16F 15/067* (2006.01)

(52) U.S. Cl.
CPC ............ *E04H 9/021* (2013.01); *E04H 9/024* (2013.01); *F16F 15/067* (2013.01)

(58) Field of Classification Search
CPC . E04H 9/021; E04H 9/02; E04H 9/024; F16F 15/067; F16F 15/022; F16F 15/06; A47B 96/1425
USPC ........................ 248/200.1; 52/167.1; 267/136
See application file for complete search history.

(56) References Cited

U.S. PATENT DOCUMENTS

| | | | | |
|---|---|---|---|---|
| 3,519,293 A * | 7/1970 | Smith | ............. | F16B 7/14 248/200.1 |
| 4,643,377 A | 2/1987 | Christianson | | |
| 5,056,753 A * | 10/1991 | Lunau | ............. | A47K 17/02 248/200.1 |
| 5,491,937 A | 2/1996 | Watson | | |
| 6,108,986 A | 8/2000 | Hiramoto et al. | | |
| 7,028,432 B2 * | 4/2006 | Manos | ............. | E04B 9/18 248/343 |
| 9,745,741 B2 * | 8/2017 | Hayes | ............. | E04B 1/985 |
| 10,047,537 B2 * | 8/2018 | Douglas | ............. | E02D 27/34 |
| 10,106,979 B2 * | 10/2018 | Lee | ............. | E04B 1/98 |
| 10,167,652 B2 * | 1/2019 | Nakakubo | ............. | F16F 15/04 |
| 2006/0179729 A1 * | 8/2006 | Li | ............. | E04H 9/02 52/167.7 |
| 2008/0250731 A1 * | 10/2008 | Wheeler | ............. | E04B 9/18 52/167.1 |

(Continued)

*Primary Examiner* — Brian D Mattei
*Assistant Examiner* — Daniel J Kenny
(74) *Attorney, Agent, or Firm* — Charles H. Jew

(57) ABSTRACT

A columnic actuated spring loader can be incorporated into existing structures. The system includes: a base that is positioned on a floor, a vertical column having a proximal end that is secured to the base and a distal end, dual vertical rods having proximal ends that are secured to the base and distal ends, and upper and lower spring mechanisms. The distal ends of the column and rods support an upper bearing plate. Each spring mechanism includes a support member that is slidably secured to the dual vertical rods, dual springs that are slidably attached to the dual rods, and bracing which is a network of rigid members that interconnect the support member, column and dual rods. Loads are transferred from the upper bearing plate and support plates to the base. The energy is dissipated into the foundation. The bracings distribute energy between the dual rods and the column.

19 Claims, 4 Drawing Sheets

(56) References Cited

U.S. PATENT DOCUMENTS

2012/0047822 A1 3/2012 Zeevi
2018/0266135 A1* 9/2018 Agha Beigi ............ E04H 9/021

* cited by examiner

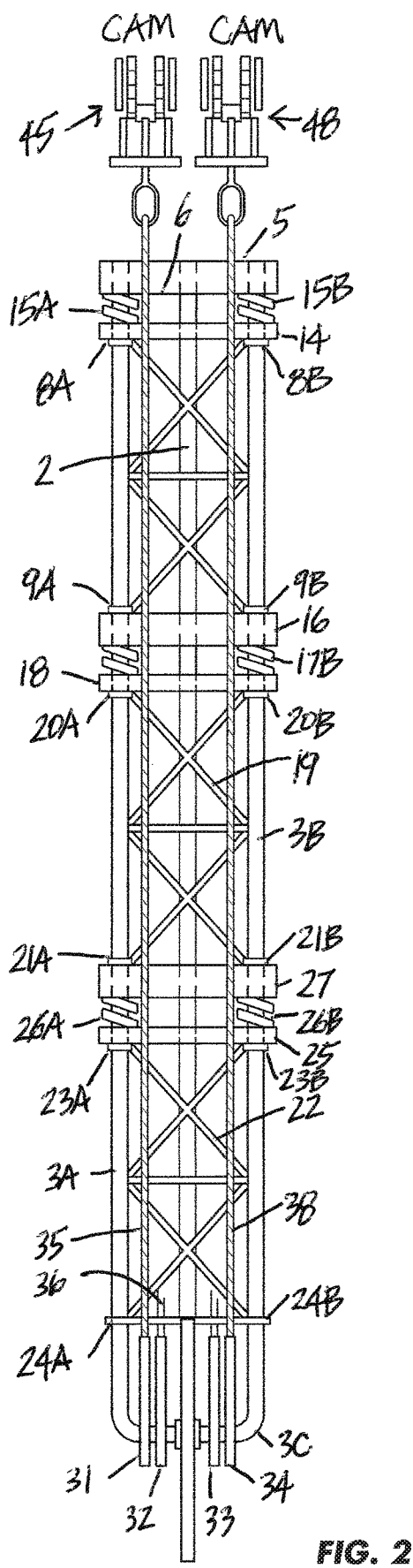
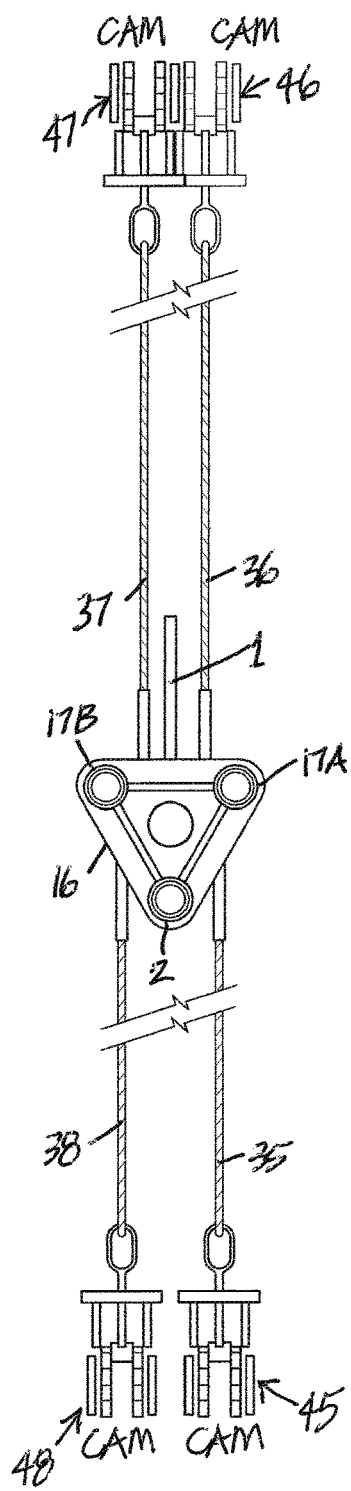
FIG. 2
FIG. 3

COLUMNIC ACTUATED SPRING LOADER SYSTEM

REFERENCE TO RELATED APPLICATIONS

The present invention claims priority to U.S. Provisional patent application No. 62/568,783 which was filed on Oct. 5, 2017 and which is incorporated herein by reference.

FIELD OF THE INVENTION

The present invention is generally directed to techniques for reinforcing structures and in particular to an earthquake-proof structural column that is suitable retrofitting older buildings, bridges and other superstructures.

BACKGROUND OF THE INVENTION

Earthquakes are unpredictable and can cause major structural damage and casualties. Buildings that are not constructed according to modern standards and code are particularly susceptible to destruction or collapse. The industry is in search of techniques for reinforcing existing structures to withstand earthquakes with minimal damage.

SUMMARY OF THE INVENTION

The present invention is based in part on the development of a columnic actuated spring loader that can be readily incorporated into new and existing structures to enhance their abilities to withstand earthquakes. In one aspect, the invention is directed to a load bearing assembly that includes:
  a vertical column having a proximal end and a distal end;
  an upper bearing plate that is mounted on the distal end of the vertical column;
  a first vertical rod having a proximal end and a distal end that is mounted to the upper bearing plate;
  a support member that is slidably secured to the first vertical rod;
  a spring that is positioned between the support member and the upper bearing plate; and
  bracing that is configured to provide lateral and diagonal structural force stability to the support member, vertical column, and first vertical rod.

In another aspect, the invention is directed to an earthquake force absorption system that includes:
  a vertical column having a proximal end and a distal end;
  an upper bearing plate that is positioned on the distal end of the vertical column;
  a first vertical rod having a proximal end and a distal end on which the upper bearing plate is positioned;
  a first support member that is slidably secured to the first vertical rod;
  a first spring that is positioned between the first support member and upper bearing plate;
  a first matrix that is configured to interconnect the first support member, vertical column and first vertical rod; and
  at least compression assembly which is positioned in tandem below the first support member and wherein each compression assembly includes:
    an intermediate slip plate that is slidably mounted to the vertical column and to the first vertical rod;
    an intermediate support member that is slidably secured to the first vertical rod;
    an intermediate spring that is positioned between the intermediate support and the intermediate slip plate; and
    an intermediate matrix that is configured to provide lateral and diagonal structural force stability to the intermediate support member, vertical column and first vertical rod, wherein the intermediate spring is aligned with the first spring along a first vertical axis.

In yet another aspect, the invention is directed to a columnic earthquake reinforcement device for buildings that includes:
  a base that is configured to be positioned on a floor the building;
  a vertical column having a proximal end that is secured to the base and a distal end;
  a first vertical rod having a proximal end that is secured to the base and a distal end;
  a second vertical rod having a proximal end that is secured to the base and a distal end; and
  an upper spring mechanism that includes:
    an upper bearing plate that is slidably mounted on the distal ends of the vertical column, first vertical rod and second vertical rod;
    a first support member that is slidably secured to the first vertical rod and second vertical rod;
    a first spring, which is slidably attached to the first vertical rod, and that is positioned between the first support member and upper slip plate;
    a second spring, which is slidably attached to the second vertical rod, and that is positioned between the first support member and the upper slip plate; and
    an upper network of rigid members that interconnect the first support member, vertical column and first and second vertical rods; and
  a lower spring mechanism that includes:
    a lower slip plate that is slidably mounted to the vertical column, first vertical rod, and second vertical rod, wherein the lower slip plate is positioned below the upper network;
    a lower support member that is slidably secured to the first and second vertical rods;
    a lower first spring, which is slidably attached to the first vertical rod, and that is positioned between the lower support member and the lower slip plate;
    a lower second spring, which is slidably attached to the second vertical rod, and that is positioned between the lower support member and the lower slip plate; and
    a lower network of rigid members that interconnect the first support member, vertical column and first and second vertical rods.

BRIEF DESCRIPTION OF THE DRAWINGS

FIG. 2 is a front elevation view the columnic actuated spring loader system;

FIG. 3 is a partial cross-sectional plan view of the columnic actuated spring loader system;

DETAILED DESCRIPTION OF THE PREFERRED EMBODIMENTS

Figure 1:
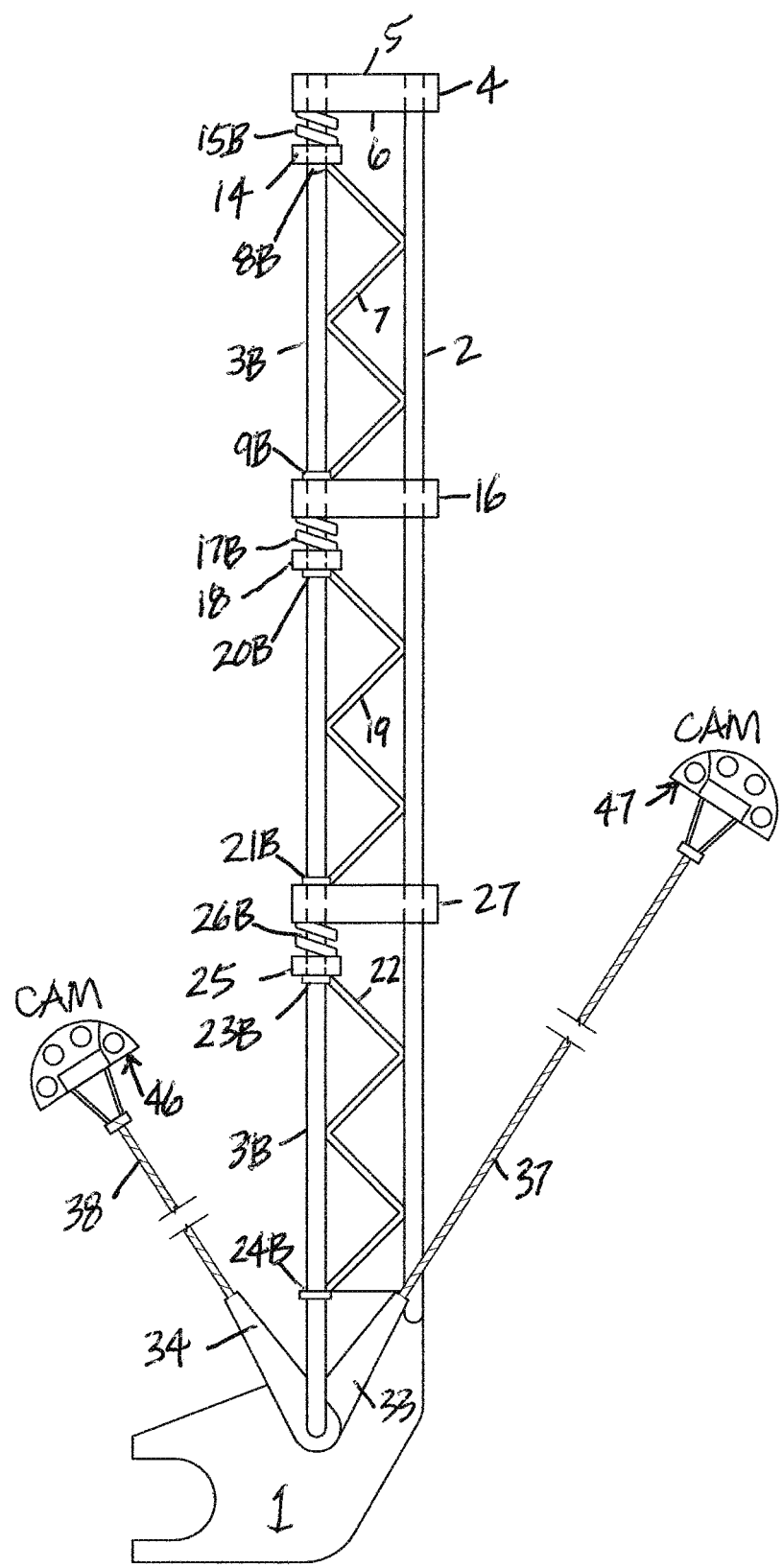
FIG. 1 is a side elevation view of a columnic actuated spring loader system.

As shown in FIGS. 1, 2 and 3, the columnic actuated spring loader system includes a steel plate base support 1 that secures a round steel support column 2 and dual steel rods 3A and 3B to the bottom of the base support. The column 2 and rods 3A and 3B provide vertical transfer of loads and stabilizes the bearing and slip plates. An upper bearing plate beam support 4 has an upper surface 5 and a lower surface 6 which is positioned or mounted to the top or distal end of support column 2. The bearing plate beam support 4 is made of wood, metal, plastic, composite, ceramic or other hard materials and is configured preferably as a planar member with an upper surface to support a beam or other elongated horizontal structure so that the beam, which is being supported, can slide horizontally and move vertically in the event of seismic activity. The bearing plate beam support 4 does not move substantially laterally as the beam shifts in the event of an earthquake.

Figure 4A:
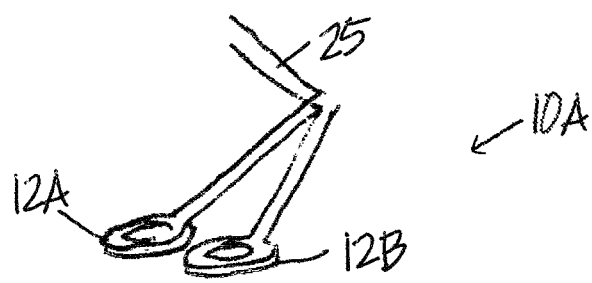
FIGS. 4A and 4B are partial perspective views of a steel diagonal webbing.
Figure 4B:
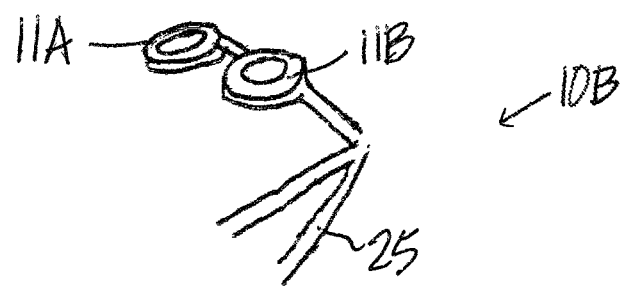

A steel diagonal webbing or bracing 7 is welded to the round steel support column 2. As further shown in FIGS. 4A and 4B, representative steel diagonal webbings 10A and 10B each includes a plurality of steel members 25 welded together to form a network or matrix that is configured to distribute stress by providing for lateral and diagonal structural force stability to the steel vertical column and dual rods. As shown in FIG. 4A, steel brace flanges 11A and 11B are welded to top portions of webbing 10A and as shown in FIG. 4B, steel brace flanges 12A and 12B are welded to bottom portions of webbing 10B. Each brace flange has a hole with a diameter of sufficient size to accommodate one of the steel rods.

Referring to FIGS. 1, 2 and 3, webbing 7 has upper brace flanges 8A, 8B and lower brace flanges 9A, 9B each defining a hole therein. Brace flanges 8A and 9A accommodate rod 3A and flanges 8B and 9B accommodate rod 3B. The webbing 7 is not welded or permanently attached to rods 3A or 3B. In this fashion, the webbing 10 can move vertically relative to the steel rods 3A and 3B but the webbing does not move appreciably laterally relative to the rods 3A or 3B or column 2. Auxiliary support wood plate 14 has a pair of holes which accommodates rods 3A and 3B and is positioned on brace flanges 8A and 8B. Thus, the auxiliary wood plate 14 is braced by the webbing 7. The auxiliary support wood plate 14 serves as a support for coil springs 15A and 15B that are wrapped around rods 3A and 3B, respectively. The dual coil springs are helical springs that are designed to operate with a compression load and provide vertical movement of a beam being supported on the bearing plate beam support 4. An intermediate wood slip plate 16 has a pair of holes in the front portion that accommodate rods 3A and 3B and a hole in the back portion that accommodates steel support column 2. In this fashion, intermediate slip plate 16 can move slidably vertically relatively to rods 3A, 3B and column 2.

A second steel diagonal webbing or bracing 19 is welded to the middle section of round steel support column 2. Webbing 19 has upper brace flanges 20A, 20B and lower brace flanges 21A, 21B each defining a hole therein. Brace flanges 20A and 21A accommodate rod 3A and brace flanges 20B and 21B accommodate rod 3B. Auxiliary support wood plate 18 has a pair of holes which accommodates rods 3A and 3B and is positioned on brace flanges 20A and 20B. Coil springs 17A and 17B are wrapped around rods 3A and 3B, respectively. An intermediate wood slip plate 27 has a pair of holes in the front portion that accommodate rods 3A and 3B and a hole in the back portion that accommodates steel support column 2. In this fashion, intermediate slip plate 27 can move slidably vertically relatively to rods 3A, 3B and column 2.

A third steel diagonal webbing or bracing 22 is welded to round steel support column 2. Webbing 22 has upper brace flanges 23A, 23B and lower brace flanges 24A, 24B each defining a hole therein. Brace flanges 23A and 24A accommodate rod 3A and brace flanges 23B and 24B accommodate rod 3B. Auxiliary support wood plate 25 has a pair of holes which accommodates rods 3A and 3B and is positioned on brace flange 23A and 23B. Coil springs 26A and 26B are wrapped around rods 3A and 3B, respectively.

The embodiment shown in FIGS. 1 and 2 employs three load bearing or compression assemblies or spring mechanisms each comprising a steel diagonal webbing and associated set of coil springs and intermediate support and slip plates. There are preferably a pair of coil springs per assembly or spring mechanism. The coil springs that are slidably engaged to rod 3A are aligned along the vertical axis defined by rod 3A and the coil springs that are slidably engaged to rod 3B are aligned along the vertical axis defined by rod 3B. For building structures with low ceilings, it may be sufficient to employ a columnic actuated spring loader with just one or two assemblies or mechanisms. Conversely, for large building structures, it may be necessary to employ a columnic actuated spring loader with four or more assemblies or mechanisms. The plurality of load bearing assemblies can be added or supplemented in tandem as needed depending on the scale of structures to be supported.

Suitable mechanisms as such cam attachment devices are employed to anchor or secure the columnic actuated spring loader system to building structures. As shown in FIG. 2, rods 3A and 3B are connected by horizontal member or shaft 3C, which has a circular diameter, to form an integral unit. Pivotally secured to shaft 3C are rotatable wood anchor arms 31, 32, 33, and 34 which are connected to steel cables 35, 36, 37 and 38, respectively. The wood anchor arms have circular bores drilled therein and the shaft 3C is inserted through the bores to allow the wood anchor arms to pivot about the shaft. Alternatively, the wood anchor arms can have clamps which are pivotally attached to the shaft. The distal ends of the cables are secured to cam attachment devices 45, 46, 47 and 48, respectively.

Figure 5:
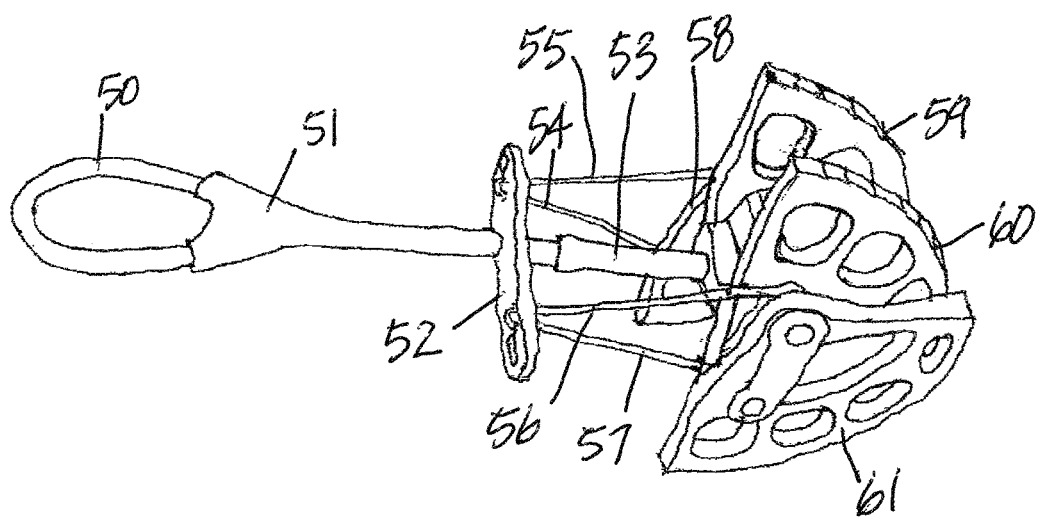
FIG. 5 is a cam attachment device.

FIG. 5 illustrates a cam attachment which includes a wire loop 50, upper stem 51, slide 52, and stem 53. Tendons 54, 55, 56, and 57 are connected to slide 52. Each of supports or cam members 58, 59, 60, and 61 has an arcuate outer surface with supports 58 and 59 forming a first pair of opposing cam members and supports 60 and 61 forming a second pair of opposing cam members. Cam members 58 and 61 pivot about a first axle (not shown) and cam members 59 and 60 pivot about a second axle (not shown). Pulling on the stem 53 which is connected to the axles, a spring mechanism forces the cams to spread or expand further apart to engage or grip concrete, rock, and other building materials. Suitable cam devices are disclosed in U.S. Pat. No. 4,643,377 that is incorporated herein by reference. The cam connects the steel cables to walls or other structural elements in buildings and other structures where the columnic actuated spring loader system is used.

Figure 6:
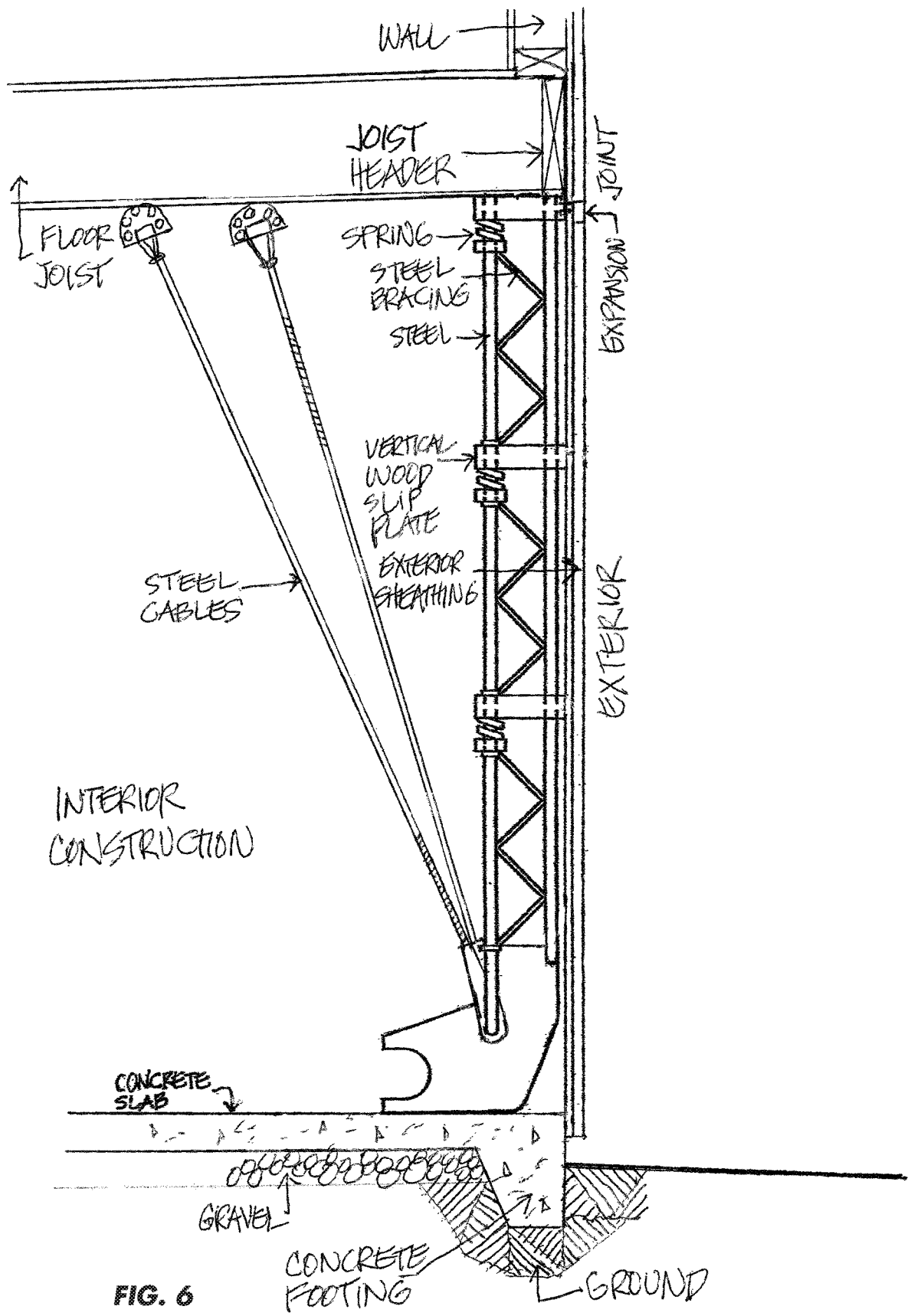
FIG. 6 illustrates employment of the columnic actuated spring loader system.

The columnic actuated spring loader system is an earthquake resistant structure for mounting in new and existing building to minimize earthquake damage. FIG. 6 illustrates employment of the system in a building that is being constructed, retrofitted or renovated. The system is particularly suited for placement against a wall. The steel plate base support is configured to rest on a floor or other horizontal surface to transfer vertical loads from the upper part of the columnic actuated spring loader system. In this illustration, the system is positioned between the concrete slab and the floor joist.

The columnic actuated spring loader system can also be positioned between floors of a building. In the case where the system is positioned on stable foundation such as bedrock, column 2 and rods 3A and 3B (FIG. 2) can be inserted into the foundation without using a base. The cables 35, 36, 37 and 38 (FIGS. 1-3) are the secured directly to the rods 3A and 3B.

In the event of an earthquake, the springs and webbing in the column are actuated and absorbs vertical forces. The spring coils and slip plates absorb forces that are generated by horizontal and vertical movement of the floor joist or beam that is being supported. Loads are transferred from the upper bearing plate and intermediate slip plates to the steel base of the column. The energy is then transferred or dissipated into the foundation. In addition, the bracings 7, 9, 22 (FIG. 1) distribute energy that is generated by vibrational forces during an earthquake between rods 3A and 3B and column 2 (FIG. 1).

What is claimed is:

1. A load bearing assembly that comprises:
   a vertical column having a proximal end and a distal end;
   an upper bearing plate that is mounted on the distal end of the vertical column;
   a first vertical rod having a proximal end and a distal end that is mounted to the upper bearing plate;
   a support member that is slidably secured to the first vertical rod;
   a spring that is positioned between the support member and the upper bearing plate; and
   bracing that is configured to interconnect the support member, vertical column, and first vertical rod and to provide lateral structural force stability to the support member, vertical column, and first vertical rod wherein the bracing comprises a web or matrix that is secured to the vertical column and the first vertical rod and that has a first proximal end that is slidably engaged to a first position of the first vertical rod and that is in contact with the support member and a first distal end that is slidably engaged to a second position of the first vertical rod.

2. The load bearing assembly of claim 1 wherein the first distal end of the bracing defines a first aperture through which the first vertical rod is inserted and the second distal end of the bracing defines a second aperture through which the first vertical rod is inserted.

3. The load bearing assembly of claim 1 further comprising a second vertical rod having a proximal end and a distal end that is mounted to the upper bearing plate and wherein the support member is slidably secured to the second vertical rod.

4. The load bearing assembly of claim 3 wherein the proximal end of the first vertical rod is secured to a base and the proximal end of the second vertical rod is secured to the base.

5. The load bearing assembly of claim 3 wherein the bracing is secured to the second vertical rod and the bracing has a proximal end that is slidably engaged to a first position of the second vertical rod and that is in contact with the support member and a distal second proximal end that is slidably engaged to a second position of the second vertical rod.

6. The load bearing assembly of claim 1 further comprising one or more cables wherein each cable has a proximal end that is secured to the first vertical rod and a distal end that is configured to be secured to a stationary building structure.

7. The load bearing assembly of claim 1 wherein the proximal end of the vertical column is secured to a base.

8. The load bearing assembly of claim 1 wherein the spring comprises a compression coil that encircles the first vertical rod.

9. The load bearing assembly of claim 1 wherein the bracing is attached to the vertical column and first vertical rod but not to the support member.

10. An earthquake force absorption system that comprises:
    a vertical column having a proximal end and a distal end;
    an upper bearing plate that is positioned on the distal end of the vertical column;
    a first vertical rod having a proximal end and a distal end on which the upper bearing plate is positioned;
    a first support member that is slidably secured to the first vertical rod;
    a first spring that is positioned between the first support member and upper bearing plate;
    a first matrix that is configured to interconnect the first support member, vertical column and first vertical rod; and
    at least one compression assembly which is positioned in tandem below the first support member and wherein each compression assembly comprises:
      an intermediate slip plate that is slidably mounted to the vertical column and to the first vertical rod;
      an intermediate support member that is slidably secured to the first vertical rod;
      an intermediate spring that is positioned between the intermediate support and the intermediate slip plate; and
      an intermediate matrix that is configured to provide lateral and diagonal structural force stability to the intermediate support member, vertical column and first vertical rod, wherein the intermediate spring is aligned with the first spring along a first vertical axis.

11. The earthquake force absorption system of claim 10 wherein the first support member, intermediate slip plate and intermediate support member are configured to move vertically but constrained from moving laterally.

12. The earthquake force absorption system of claim 10 wherein the first spring is slidably attached to the first vertical rod and the intermediate spring is slidably attached to the first vertical rod, and the system further comprising:
    a second vertical rod having a proximal end and a distal end on which the upper bearing plate is positioned;
    a second spring that is positioned between the first support member and upper bearing plate;
    wherein the first matrix that is configured to interconnect the first support member, vertical column and first and second vertical rods; and
    wherein the intermediate slip plate is slidably mounted to the vertical column and to the first and second vertical rods, wherein the intermediate support member is slidably secured to the second vertical rod, wherein the intermediate matrix that is configured to provide lateral and diagonal structural force stability to the intermediate support member, column and first and second vertical rods, and the at least one compression assembly further comprises a second intermediate spring which is slidably attached to the second vertical rod and that is positioned between the intermediate support and the intermediate slip plate, and wherein the second intermediate spring is aligned with second spring along a second vertical axis.

13. The earthquake force absorption system of claim 12 further comprising a base and wherein the proximal ends of the vertical column and first and second vertical rods are secured to the base.

14. The earthquake force absorption system of claim 13 further comprising one or more cables wherein each cable has a proximal end that is secured to the base and a distal end that is configured to be secured to a stationary building structure.

15. A columnic earthquake reinforcement device for buildings that comprises:
   a base that is configured to be positioned on a floor the building;
   a vertical column having a proximal end that is secured to the base and a distal end;
   a first vertical rod having a proximal end that is secured to the base and a distal end;
   a second vertical rod having a proximal end that is secured to the base and a distal end; and
   an upper spring mechanism that comprises:
      an upper bearing plate that is slidably mounted on the distal ends of the vertical column, first vertical rod and second vertical rod;
         a first support member that is slidably secured to the first vertical rod and second vertical rod;
      a first spring, which is slidably attached to the first vertical rod, and that is positioned between the first support member and upper slip plate;
      a second spring, which is slidably attached to the second vertical rod, and that is positioned between the first support member and the upper slip plate; and
      an upper network of rigid members that interconnect the first support member, vertical column and first and second vertical rods; and
   a lower spring mechanism that comprises:
      a lower slip plate that is slidably mounted to the vertical column, first vertical rod, and second vertical rod, wherein the lower slip plate is positioned below the upper network;
      a lower support member that is slidably secured to the first and second vertical rods;
      a lower first spring, which is slidably attached to the first vertical rod, and that is positioned between the lower support member and the lower slip plate;
      a lower second spring, which is slidably attached to the second vertical rod, and that is positioned between the lower support member and the lower slip plate; and
      a lower network of rigid members that interconnect the first support member, vertical column and first and second vertical rods.

16. The columnic earthquake reinforcement device for buildings of claim 15 further one or more supplemental spring mechanisms, which is positioned below the lower spring mechanism, and that comprises:
   a supplemental slip plate that is slidably mounted to the vertical column, first vertical rod, and second vertical rod, wherein the supplemental slip plate;
   a supplemental support member that is slidably secured to the first and second vertical rods;
   a supplemental spring, which is slidably attached to the first vertical rod, and that is positioned between the lower support member and the lower slip plate; and
   a supplemental network that is configured to interconnect the first support member, column and first and second vertical rods.

17. The columnic earthquake reinforcement device of claim 15 further comprising one or more cables that are configured to be secured to the device to a building structure to provide lateral tension to the first and second vertical rods.

18. The columnic earthquake reinforcement device of claim 15 wherein the base comprises a first rotatable arm that is connected to a first cable and a second rotatable arm that is connected to a second cable.

19. The columnic earthquake reinforcement device of claim 15 wherein the network of rigid members is welded to the vertical column and first and second vertical rods.

* * * * *